(12) United States Patent
Wallener

(10) Patent No.: US 9,964,803 B2
(45) Date of Patent: May 8, 2018

(54) CUSTOM PSFS USING CLUSTERED LIGHT SOURCES

(71) Applicant: Dolby Laboratories Licensing Corporation, San Francisco, CA (US)

(72) Inventor: Damir Wallener, Duncan (CA)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days. days.

(21) Appl. No.: 15/489,353

(22) Filed: Apr. 17, 2017

(65) Prior Publication Data

US 2017/0219879 A1    Aug. 3, 2017

Related U.S. Application Data

(63) Continuation of application No. 14/333,488, filed on Jul. 16, 2014, now Pat. No. 9,646,548, which is a continuation of application No. 14/018,301, filed on Sep. 4, 2013, now Pat. No. 8,860,769, which is a continuation of application No. 13/129,305, filed as application No. PCT/US2009/063690 on Nov. 9, 2009, now Pat. No. 8,531,492.

(60) Provisional application No. 61/114,548, filed on Nov. 14, 2008.

(51) Int. Cl.

| | |
|---|---|
| G09G 5/10 | (2006.01) |
| G02F 1/1335 | (2006.01) |
| G09G 3/3258 | (2016.01) |
| G02F 1/35 | (2006.01) |
| G09G 3/34 | (2006.01) |
| G02B 27/00 | (2006.01) |
| G02B 19/00 | (2006.01) |

(52) U.S. Cl.
CPC ... G02F 1/133603 (2013.01); G02B 19/0066 (2013.01); G02B 27/0012 (2013.01); G02B 27/0087 (2013.01); G02F 1/3515 (2013.01); G09G 3/3258 (2013.01); G09G 3/3406 (2013.01); G09G 2300/0473 (2013.01); G09G 2320/0626 (2013.01)

(58) Field of Classification Search
CPC ............ G02F 1/133603; G02F 1/3515; G02B 19/0066; G02B 27/0087; G02B 27/0012; G09G 3/3406; G09G 3/3258; G09G 2320/0626; G09G 2300/0473; G09G 3/36; G09G 5/10; G09G 3/3413; G09G 3/3426

See application file for complete search history.

(56) References Cited

U.S. PATENT DOCUMENTS

| | | | |
|---|---|---|---|
| 8,493,313 | B2 | 7/2013 | Damberg |
| 8,698,729 | B2 | 4/2014 | Ward |
| 8,890,902 | B2 | 11/2014 | Johnson |
| 2003/0011538 | A1 | 1/2003 | Lys |

(Continued)

FOREIGN PATENT DOCUMENTS

| | | |
|---|---|---|
| CN | 1690767 | 11/2005 |
| CN | 1776503 | 5/2006 |

(Continued)

*Primary Examiner* — Adam R Giesy

(57) ABSTRACT

Light sources of a backlight are configured to customize the shape of light emitted from the clusters. The clusters are activated as a unit and modulated as to brightness, but of the customized shape. All clusters can have a similar customized PSF, or the customization of each cluster may be varied in real time. Real time changes of a clusters PSF may be based, for example, an image or a region of the image to be displayed using the clusters.

21 Claims, 7 Drawing Sheets

(56) References Cited

U.S. PATENT DOCUMENTS

| | | |
|---|---|---|
| 2006/0087827 A1 | 4/2006 | Yung |
| 2006/0103612 A1 | 5/2006 | Ozaki |
| 2006/0103621 A1 | 5/2006 | Feng |
| 2006/0120082 A1 | 6/2006 | Choo |
| 2006/0238465 A1 | 10/2006 | Kurumisawa |
| 2006/0239033 A1 | 10/2006 | Jung |
| 2007/0176183 A1 | 8/2007 | Morejon |
| 2008/0129752 A1 | 6/2008 | Riley |
| 2009/0021469 A1 | 1/2009 | Yeo |
| 2009/0058876 A1 | 3/2009 | Wang |
| 2009/0167670 A1 | 7/2009 | Peng |

FOREIGN PATENT DOCUMENTS

| | | |
|---|---|---|
| CN | 101256759 | 9/2008 |
| JP | 08-285726 | 1/1996 |
| WO | 2007018917 | 2/2007 |

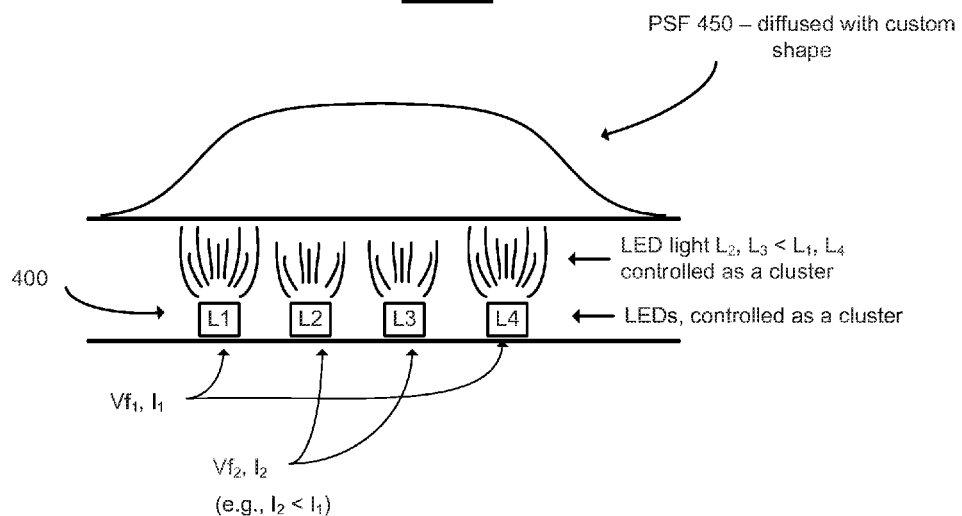
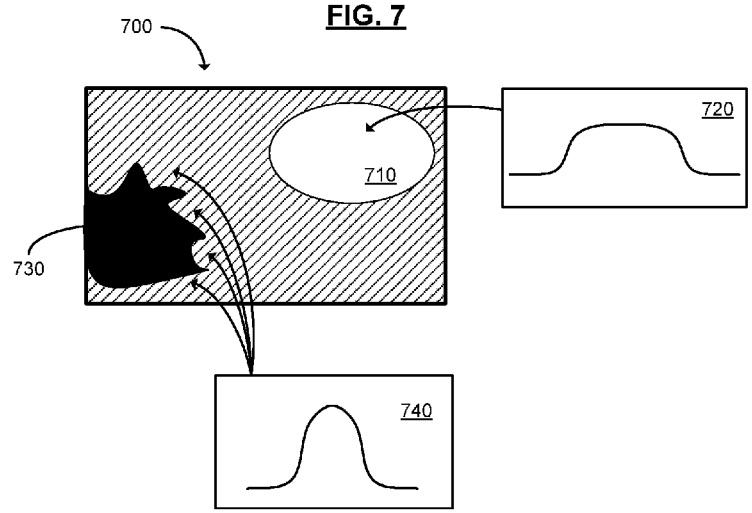

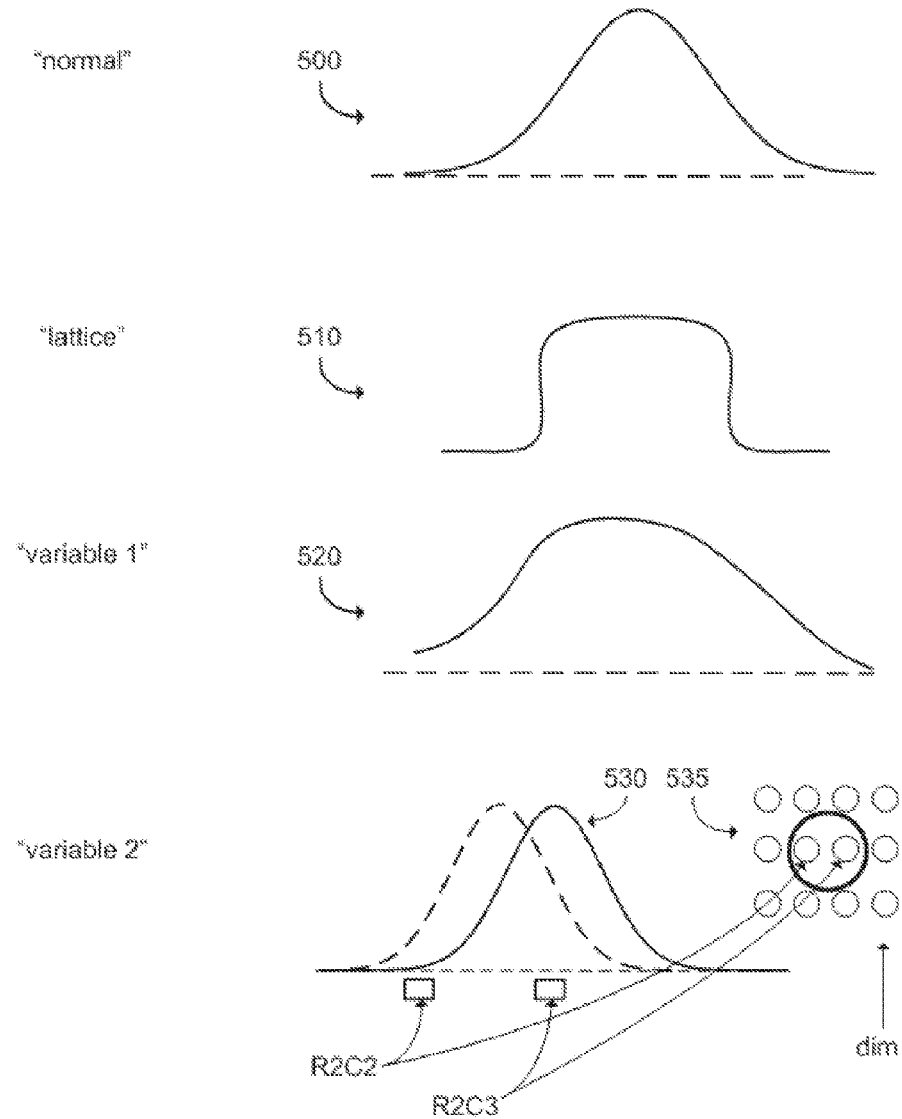

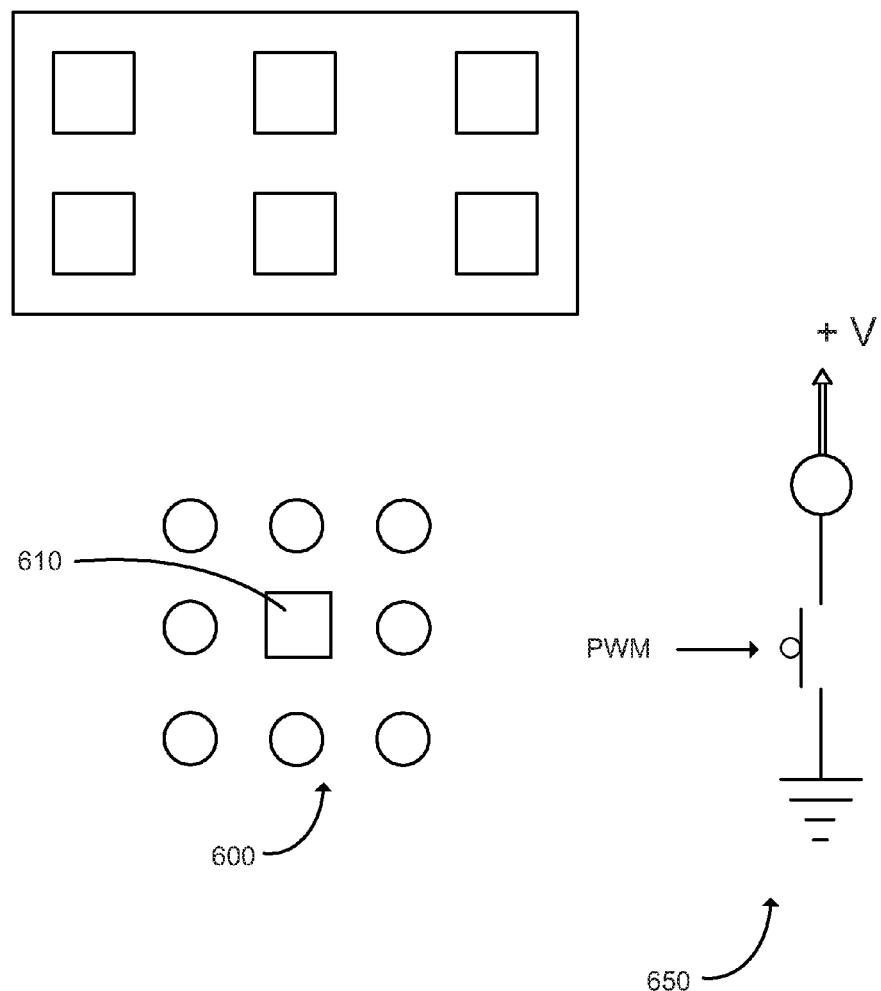

CUSTOM PSFS USING CLUSTERED LIGHT SOURCES

BACKGROUND OF THE INVENTION

Field of Invention

The present invention relates to display devices.

Description of Related Art

Existing solutions for LED backlighting use either individually controlled LEDs, or a cluster of LEDs controlled as an individual unit. In each case, each LED is presented with a voltage and currents substantially identical to every other LED.

The diffused light output, or PSF, is essentially predetermined by the emissive pattern of an individual LED. As shown in FIG. 1, a single LED 100 produces a fixed light emission patter (LED light) 110. The LED light is incident, for example, on optical films 120, resulting in the production of a shaped light output, or PSF 130 (pattern of diffused light). The PSF 130 is essentially constant, but may vary in intensity according to modulation or a brightness level energizing the LED.

A similar result occurs when using light source clusters. FIG. 2 is an example of an LED cluster 200 that results is a PSF 250. Here, the PSF 250 is mainly composed of an aggregate of light from the LED cluster 200. The PSF 250 has a different shape, but again is essentially constant with a varying intensity.

SUMMARY OF THE INVENTION

The present inventor has realized that a significant obstacle to creating economically-viable individually-modulated LED backlights is the shape of the light being emitted from the LEDs and lighting the back of the LCD panel. The present invention provides a cost-effective way of shaping light emitted by a backlight.

Roughly described, the present invention provides for the creation of PSFs of arbitrary shapes. In one embodiment, the invention comprises an LED cluster comprising an array of LEDs that are energized with a pattern of voltages and/or currents to produce a custom PSF. The array can be aligned on rectangular points, or other arbitrary arrangement, such as triangular or hexagonal. The cluster may be controlled, for example, as a single unit.

In one embodiment, the invention comprises a display, comprising a backlight comprising an array of light sources arranged in clusters, wherein the clusters are configured to emit a light pattern having a custom PSF. The PSF comprises, for example, a customization via the application of at least one of variable spacing between light sources of a cluster, different amounts of energization applied to light sources within a cluster, different types of energization applied to light sources of a cluster, different light source sizes of a cluster. The light sources are, for example, LEDs.

In one embodiment, the custom PSF light pattern may be determined by an energization selected from a group of possible energizations each providing a different custom PSF. The custom PSF light pattern may be determined, for example, by an energization selected from a group of possible energizations each providing a different custom PSF, and a custom PSF light pattern is selected for each cluster based on image data in a region of an image most closely corresponding to the cluster.

In one embodiment, the display further comprises a light modulator disposed so as to be illuminated by the clusters, wherein modulation data of the light modulator comprises artifact reduction to be applied to individual pixels based on at least one custom PSF illuminating the individual pixels. The light clusters, for example, are then energized with light levels roughly equivalent to or approximating a low resolution version of a desired image, and the light modulator further modulates the light emitted from the clusters so that the light approaches the desired image. The further modulation comprises, for example, artifact reduction techniques targeting artifacts created by the use of the custom PSFs.

The above embodiments may include, for example, a processor configured to receive image data and apply variable energization patterns to selected groups of light sources within each cluster to implement a custom PSF selected based on the received image data. The selected custom PSFs are, for example, selected for image regions transitioning to dark comprises a narrow PSF and the selected custom PSF selected for image regions corresponding to bright areas comprises a flat PSF.

The present invention may be embodied as a method, comprising the steps of, receiving image data, evaluating regions of the image data to determine qualities of the image regions, and applying a custom PSF to a cluster of light sources corresponding to each region, wherein the custom light source is best suited to illuminating an area of a light modulator corresponding to the region. In one embodiment, the best suited light sources comprises a narrow PSF for dark transition regions, and a flat PSF for brighter regions. In another embodiment, the applied custom PSF is selected from a group of custom PSFs.

In various embodiments, the method further comprises the step of determining a modulation for a spatial modulator illuminated by the clusters, wherein the determined modulation comprises artifact reduction techniques selected based on the PSFs of the clusters illuminating the modulator.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an illustration of an LED cluster and PSF according to an embodiment of the present invention;

FIG. 5 is a graph of several alternative PSFs that may be utilized or customized further according to various embodiments of the present invention;

FIG. 6 is a schematic drawing of an implementation of a cluster having individual light sources of varying sizes and variable modulation according to an embodiment of the present invention;

FIG. 7 is a drawing of an image on an LCD screen illuminated by different custom PSFs according to an embodiment of the present invention;

DESCRIPTION OF THE PREFERRED EMBODIMENTS

Figure 1:
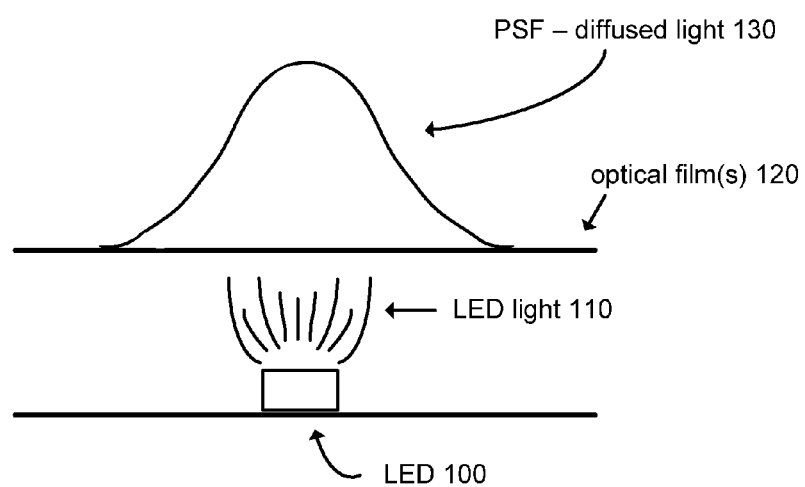
FIG. 1 is an illustration of a single LED PSF.
Figure 2:
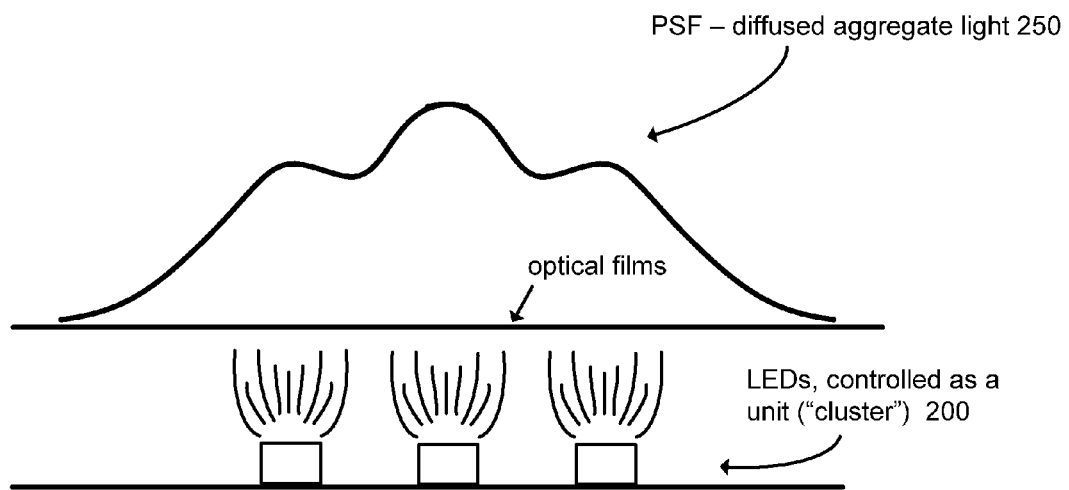
FIG. 2 is an illustration of a LED cluster PSF.
Figure 3:
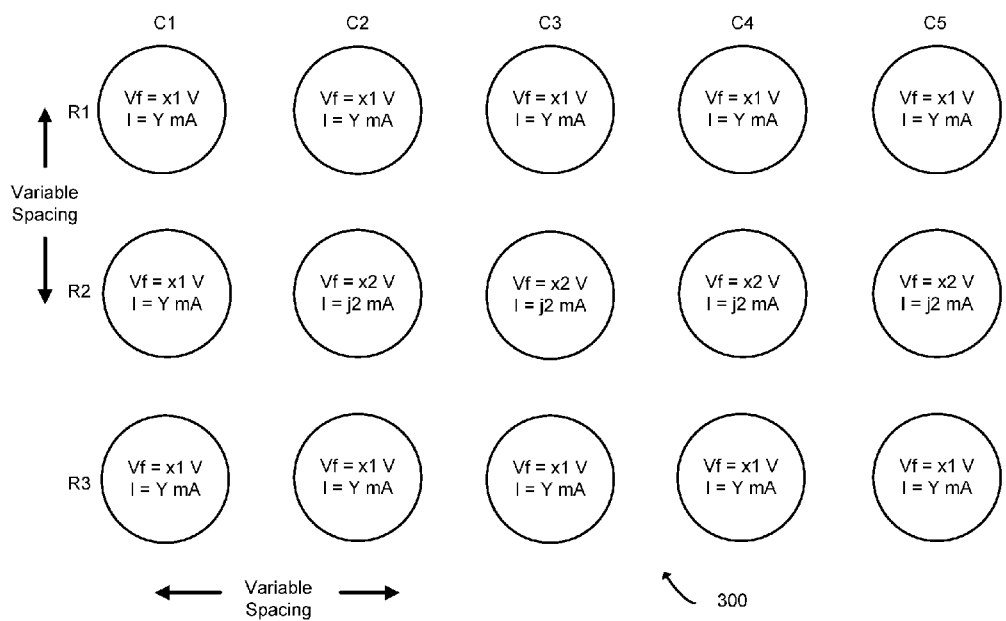
FIG. 3 is a schematic of an arrangement of LEDs in a cluster according to an embodiment of the present invention.

Referring again to the drawings, wherein like reference numerals designate identical or corresponding parts, and more particularly to FIG. 3 thereof, there is illustrated a schematic of an arrangement of LEDs in a cluster 300 according to an embodiment of the present invention. The cluster 300 is an exemplary cluster according to an embodiment of the present invention and comprises a 3×5 array of LEDs (e.g., LED R1,C1 and LED R3,C5 at opposite corners of the array). In other embodiments, specific rows and columns may not be apparent, and the clusters may take on shapes other than row by column arrays.

The LEDs within the cluster may be energized at variable levels. For example, in the exemplary embodiment, LEDs R2,C2/C3/C4/C5 are each shown as being energized at Vf=x2 V, I=j2 mA; and the remaining LEDs, including R1,C1 are shown as being energized according to approximately Vf=x1 V, I=Y mA. Here "x1" and "x2" represent different voltages applied to the LEDs. The current driving each LED is represented by "j1" and "j2". The number of different voltages and currents provided is constrained only by the number of LEDs in the cluster.

Alternatively or in addition, the spacing between any pair or group (e.g., row, column, or subcluster) of LEDs does not have to be constant, allowing for further light shaping possibilities. In the illustrated exemplary array embodiment the LEDs may include, for example, variable spacing of the rows and columns. Variable spacing between LEDs or the indicated variable spacing between rows and/or columns is utilized to customize the PSF ultimately projected from the cluster.

The goal of this flexible arrangement is to increase the light shaping ability of the backlight. The differences in energization level or variable spacing of what are otherwise essentially the same LEDs, causes a different PSF to result. In this case, the interior and middle LEDs have less intensity and would tend to flatten the PSF.

FIG. 4 is an illustration of an LED cluster 400 containing LEDs L1, L2, L3, and L4, and resulting PSF 450 according to an embodiment of the present invention. As illustrated, LEDs L1 and L4 are energized at a higher level (Vf1, I1) than LEDS L2 and L3 (which are energized, for example, at Vf2, I2, where I2<I1). Because of the different energization levels, LEDs L2 and L3 produce less light than LEDs L1 and L4. The result is a diffused PSF with a custom shape.

FIG. 5 is a graph of several alternative PSFs that may be utilized or customized further according to various embodiments of the present invention. The illustrated PSFs may be created, for example, by variable spacing of LEDs in a cluster, variable energization of LEDs within a cluster, variable LED sizing within a cluster, variable LED properties within a cluster, or any other variable of backlights that cause a change or variance in the emitted PSFs.

For example, decreasing the voltage or current to LEDs in the center of the cluster can produce a PSF with a flatter luminance profile across the top, and relatively sharper drop off on the edges. Alternately, the center of the cluster can be driven harder than the edges to create a PSF with higher than usual luminance above the center of the cluster. Adjusting the spacing of LEDs inside the cluster can be used to achieve similar effects by modifying the amount of luminance overlap between LEDs.

All combinations of the above and other variables are envisioned. For example, a custom PSF emitted by an LED cluster wherein LEDs within the cluster have different properties including variable spacing between LEDs, different energizations (e.g., any or all of current, voltage, modulation differences), different native luminosities, different native colors, different sizes, different types of LEDs.

More specifically, each of illustrated and exemplary custom PSFs may be produced as specified in Table 1:

TABLE 1

| Name | Construction | 1st Alternate Construction | Potential Use |
| --- | --- | --- | --- |
| Normal 500 | Evenly spaced array of light sources with similar properties | Unevenly spaced light sources of different intensities | Average intensity areas |
| Lattice 510 | Bright cluster outline | Central region of cluster having greater spacing between light sources | Daylight scenes |
| Variable 1 520 | Decreasing intensity moving inward, without decreasing peak PSF intensity | Less light sources and even greater spacing between light sources | Brightest areas |
| Variable 2 530 | Bright central region | More LEDs and/or less space between LEDs in central region of cluster | Bright to dark transitions (esp near the dark areas) |

The variable 1 and variable 2 examples illustrate yet another feature of the invention where one or more relatively brighter (or relatively dimmer) light sources in a cluster can change position. Such embodiments may be implemented through electronic switching that identifies the light source(s) of a cluster that is intended to be relatively brighter or dimmer. In the case of variable 2 PSF 530, a selected relatively brighter light source is "shifted" left (from R2C3 to R2C2 of cluster 535 causing a peak of the PSF 530 to shift left (shifted PSF 532). The result is a peak that may be electronically shifted.

Shifting or changing properties of other PSFs can take the form of further shifting or re-shaping of the PSFs on-the-fly (e.g., usable in changing PSFs during viewing of images displayed using the PSFs). In addition to the flexibility afforded by being able to shift the peaks of a PSF, such shifting may also be used to more closely target transition areas that could benefit from having a sharp peaked PSF by moving the peak more precisely into position at a transition, or following a moving transition between frames of a video.

Other alternate constructions may utilize, for example, smaller light sources where constructions call for greater spacing between light sources and/or decreased intensity light sources. FIG. 5 also indicates exemplary physical construction of the 535 clusters (e.g., variable 2 having 2 higher luminance light sources surrounded by a border of relatively lower luminance light sources. And again, any number of combinations of spacing, driven intensities, or light source sizes may be utilized to create the same or similar effects.

FIG. 6 is a schematic drawing of an implementation of a cluster 600 having individual light sources of varying sizes and variable modulation according to an embodiment of the present invention. The light sources are approximately evenly spaced, but are of different sizes and luminosities. In this example a central light source 610 is a relatively large sized LED and the surrounding, relatively smaller light sources are relatively smaller LEDs. In addition, the clusters, which are preferably controlled as a unit, may optionally include a modulation device 650 that varies a modulation of the cluster so it produces PSFs of varying overall intensity.

In this example, the modulation device 650 provides a modulated power source for driving the LEDs. Different types of modulation may be utilized, and, in this example, modulation device 650 is a Pulse Width Modulation (PWM) device. In one embodiment, rather than being controlled strictly as a unit, multiple modulation devices may be utilized. For example, by provision of a second modulation device (not shown), one modulation device can be configured to energize the smaller LEDs as a group and the other modulation device can be configured to energize the larger sized central light source 610 Like the differences in light source size, spacing, luminosity, etc, differences in modulation between the various light sources in a cluster can affect the PSF of the cluster in a manner to produce the desired PSF.

In one embodiment, a display according to the present invention is produced by providing a series of clusters similarly customized according to one or more embodiments of the present invention. The similarly customized clusters are arranged, for example, as a backlight in a dual modulation High Dynamic Range display. The customization of the PSFs is, for example, selected as a PSF that is best suited for all regions of an entire image to be displayed. The best suited PSF is determined, for example, by averaging areas or regions of an image to be displayed, and selecting the PSF that meets a set of predetermined requirements for each area or region.

Alternatively, a backlight in a dual modulation display may be configured with a series of clusters, each being customizable on-the-fly. In one embodiment, all of the clusters are customized on-the-fly. On-the-fly customization is performed, for example, by varying by one or more real-time variable PSF customization properties, such as, for example, varying a luminosity of predetermined sets of LEDs within a cluster. Such real-time customizations may be performed on straight row by-column arrays of LED clusters, or clusters with, for example, varied "fixed" customizations (e.g., LED spacing, sizing, or other not normally adjustable qualities). In one embodiment, each cluster includes a programmable switch that varies the PSFs in varying degrees from, for example, a sharp contrasting PSF to a low flat-top PSF. The customized PSF is then energized as a unit for a desired brightness or luminosity of the entire PSF.

FIG. 7 is a drawing of an image on an LCD screen 700 illuminated by different custom PSFs according to an embodiment of the present invention. The displayed image includes a bright area 710 and a dark area 730 separated by moderately bright or transitional areas. As shown, a "flattened" PSF 720 (e.g., similar to 510/520) is utilized in clusters directly illuminating the bright area 710. The transitional areas, particularly those close to the dark area 730 are illuminated with backlight clusters exhibiting a more "peaked" PSF 740 (e.g., similar to Variable 2 530 described above). In this manner, each portion of an image being reproduced may use a backlight cluster that is particularly advantageous to the image qualities of the portion.

Figure 8:
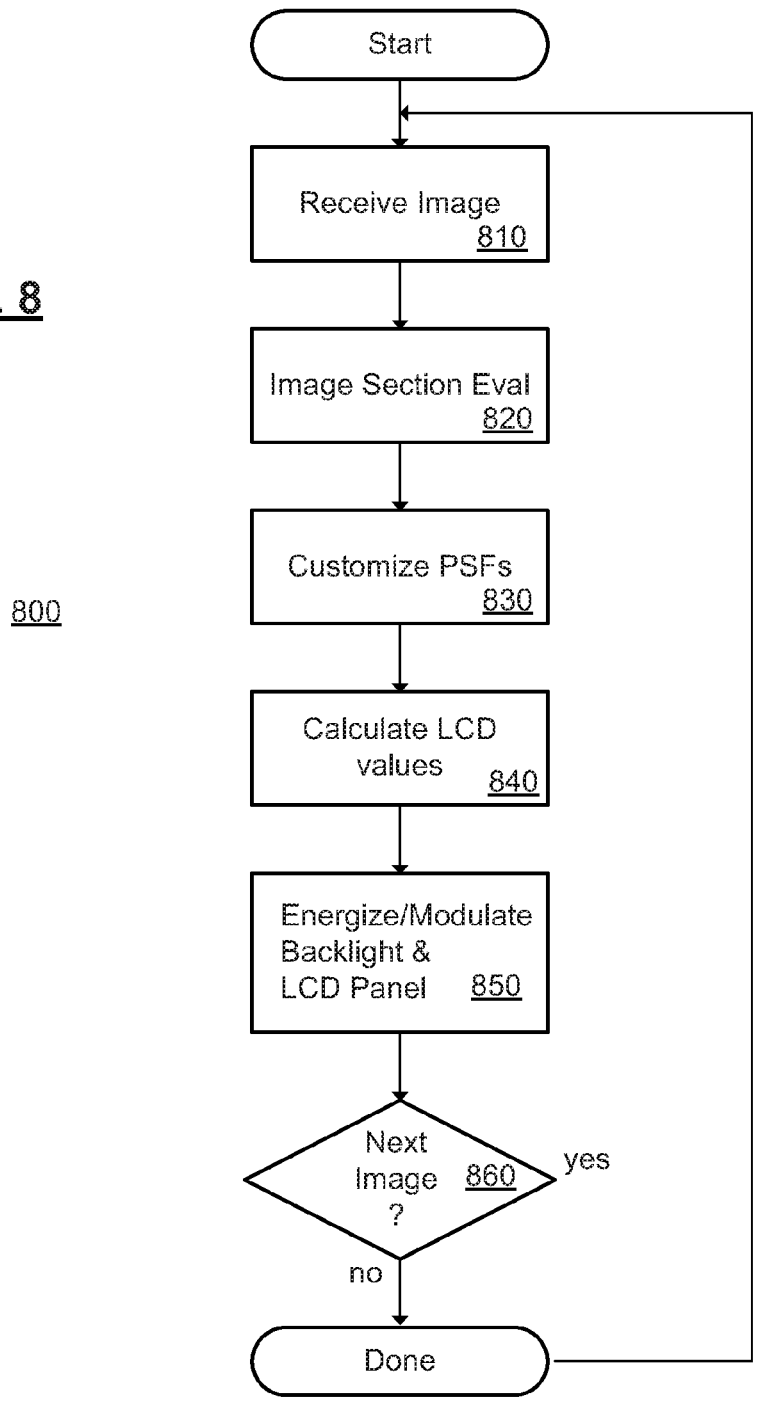
FIG. 8 is flow chart of a process according to an embodiment of the present invention.

FIG. 8 is flow chart of a process 800 according to an embodiment of the present invention. The process 800 implements an on-the-fly customized PSF based on a received image. At step 810 an image is received. The image is for example, a portion of an HDTV over-the-air broadcast, video/image data received from cable or satellite, video/image content from a DVD/Blue Ray player, i-Pod, Hard Disk Drive (HDD), memory stick or other storage device, and/or video/images received from a cell phone, network, or high speed internet or intranet. The video/image data may be coupled with, for example, audio data such as Dolby Digital® or other audio formats for use in the simultaneous presentation of audio media.

At step 820, the image data is sectioned and evaluated. The sections of the image, for example, roughly correspond to areas or regions of an image mainly illuminated by each cluster. The evaluation comprises, for example, an averaging of luminosities, colors, or other properties of the image within each section. The evaluation may include, for example, a transition evaluation to identify transitional areas between light or moderate and dark sections of the image.

Based on the evaluation a custom PSF is selected, and, at step 830 the backlight clusters are customized to produce the selected PSFs. At step 840, $2^{nd}$ modulation values are calculated (e.g., LCD modulation values). The LCD modulation values may be calculated in anyway that results in the desired image being displayed when backlit by the clusters with customized PSFs, including, for example, modulating the LCD with differences between a pattern of light emitted by the backlight clusters and the desired image. In one embodiment, the LCD is modulated with data of the desired image.

However, depending on the PSFs selected, more or less artifacts may be produced. Therefore, based on the PSF patterns selected and their implementation, the present invention includes a customization of artifact reduction processing which results in optimized values used to control the LCD pixels for pixels illuminated by the selected PSFs. And, for example, since the LCD pixels on one part of the display are potentially illuminated by a backlight cluster of a different PSF compared to LCD pixels on a different part of the display, various sets of pixels values are produced through processing that utilizes different sets of artifact reduction techniques. Such artifact reduction techniques may be selected, for example, from those described in Harrison et al., U.S. Provisional Patent Application Ser. No. 61/020,104, entitled "Mitigation of LCD Flare," filed Jan. 9, 2008.

Each such technique would be tested against each potential type of PSF and the best technique or set of techniques are memorialized in a database or table from which they are selected. Alternatively, the database is maintained within the programming or code of a device operating according to the present invention.

Figure 9:
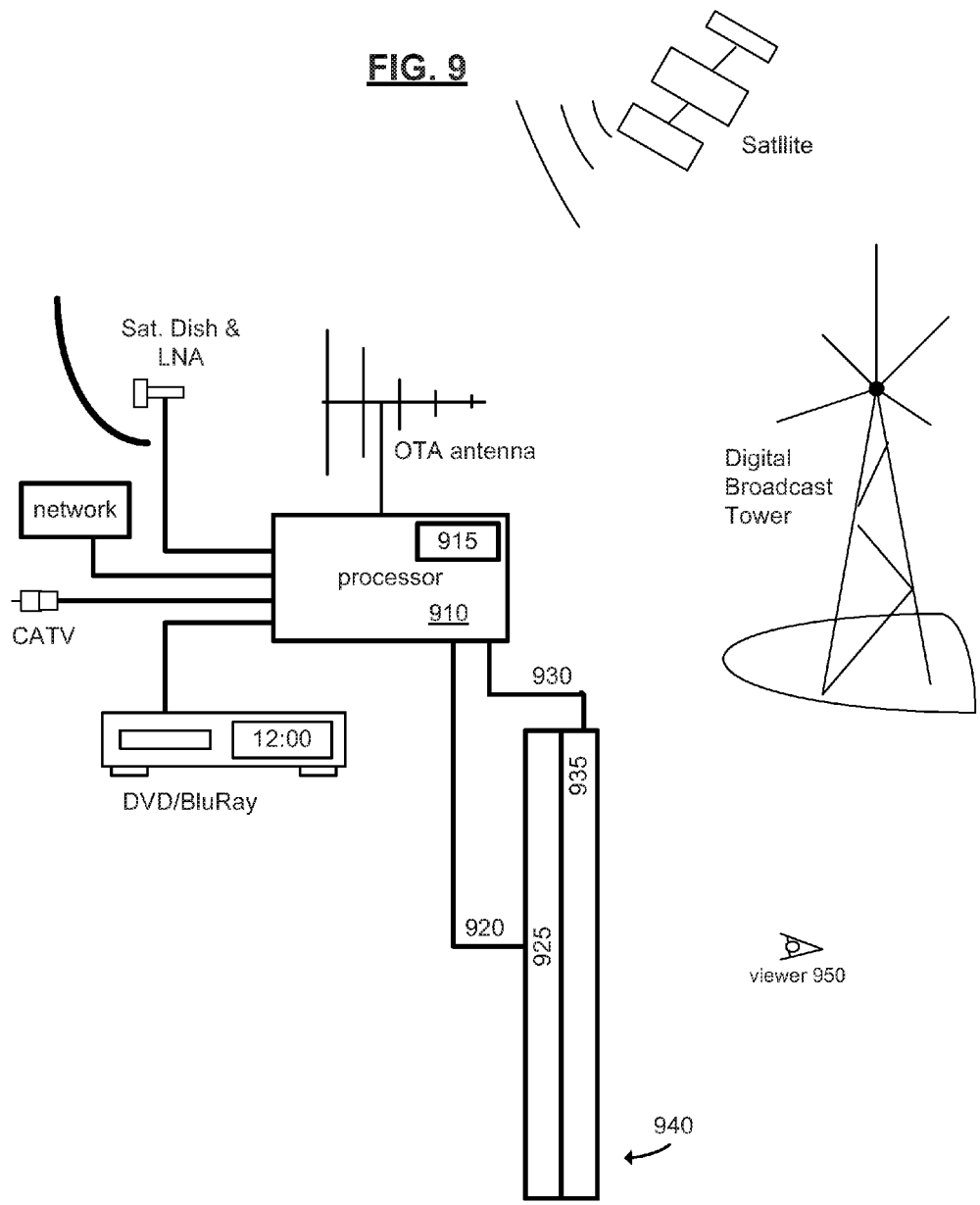
FIG. 9 is a system according to an embodiment of the present invention.

FIG. 9 is a system according to an embodiment of the present invention. A processor 910 receives image data from any of a number of sources. The processor includes, for example, a memory 915 or other computer readable storage that provides instructions that, when loaded into a CPU or other computing mechanism of the processor, causes the processor to perform the steps of the processes described herein. In some embodiments, Memory 915 also includes, for example, storage for a PSF database and is utilized by programming that instructs processor 910.

The image data is processed (including any processing necessary to extract the image data from its broadcast or transmitted formats (e.g., ATSC, PAL, MPEG, MPEG-4, AVC, and other formats)). The processing also includes image sectioning and evaluation, selection of PSFs as described above, and the production of control signals 920 for energizing the backlight in a manner to produce the selected custom PSFs. The control signals 920 are transmitted to a backlight 925.

Modulation signals 930 for controlling LCD pixels, and including any selected artifact reduction techniques as described above are also produced based in part on the selected PSFs and are transmitted to an LCD 935. The combination of custom PSFs produced by the backlight and LCD modulation provides an image on an HDTV or monitor device 940 and viewed by a viewer 950.

Although LEDs and light sources are used somewhat interchangeably herein, the present invention has been described herein with reference to LEDs for use in creating backlight clusters. However, it should be understood that other types of light source may be substituted therewith. In addition, the present invention describes dual modulation mainly using an LCD panel as a $2^{nd}$ modulator, but it should be understood that other types of modulators (e.g., spatial light modulators) may be substituted therewith. Further, other types of displays or projection systems can be modified or fitted with the techniques and processes described herein which will be apparent to the ordinarily skilled artisan upon review of the present disclosure.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents (including legal doctrine related equivalents and what one of ordinary skill in the art would understand as an equivalent). For example, when describing a cluster, any other equivalent device, such as a string of lights in parallel or series, light sources from phosphors, electrical sources, nanotube based light emission devices, or lights of other origins, or other devices having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to the parts and processes of the present invention, should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, receiving image data, unpacking image data, sectioning image data, selecting custom PSFs, preparing modulation signals, including LCD modulation signals with artifact reduction applied, selecting artifact reduction based on selected customized PSFs of backlight clusters, and the display, storage, or communication of results according to the processes of the present invention.

The present invention may suitably comprise, consist of, or consist essentially of, any of element (the various parts or features of the invention) and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be included in a subsequently filed utility patent application, the invention may be practiced otherwise than as specifically described herein.

What is claimed:

1. A dual modulation projector, comprising:
    a lighting device comprising a series of light element clusters, each cluster energized to produce a specific Point Spread Function (PSF) that varies from one frame to the next frame in a set of images to be displayed by the projector, wherein a PSF of a first frame of the images comprises at least one light element cluster having a relatively narrow PSF and a PSF of a second frame of the images comprising a relatively broad PSF;
    the lighting device further configured to produce an intensity modulation from light element cluster-to-light element cluster over and above variations in PSF from one cluster to the next;
    a modulator configured to be illuminated by the intensity modulated variable PSF clusters; and
    a controller configured to vary intensity and PSF of each cluster of the lighting device based on image data, and to energize the modulator according to differences of light intensity at each pixel of the modulator and a desired image represented by the image data.

2. The projector according to claim 1, wherein the lighting device comprises a plurality of narrowband light sources energized differently.

3. The projector according to claim 1, wherein the lighting device comprises an energizable modulation device illuminated by narrowband light sources.

4. The display according to claim 3, wherein the variations in PSFs are produced via on-the-fly customization of a real-time variable PSF property.

5. The display according to claim 4, wherein the customization of a real-time variable property comprises luminance and wherein during one time period a first set of lighting elements of a cluster are off and second set of lighting elements of the cluster are on and during a subsequent time period different sets of lighting elements are either on or off.

6. The display according to claim 4, wherein the customization of a real-time variable property comprises luminance and wherein during one time period a first set of lighting elements of a cluster have a first effect other than intensity on an area of the modulator and a second effect other than intensity on another area of the modulator during a second time period.

7. The display according to claim 4, wherein the variations of the PSFs are customized via the application of a custom modulation scheme to each cluster.

8. A display, comprising:
a first projection mechanism comprising a set of individually addressable elements configured to produce a spatially modulated light;
a modulation device positioned to be illuminated by the spatially modulated light;
wherein the individually addressable elements of the first projection mechanism are energized as dynamically reconfigurable clusters reconfigured in both intensity and pattern such that the illuminating pattern on the modulation device from a cluster in one time period comes from a different set of individually addressable elements than the illuminating pattern on the modulation device in a next time period.

9. The display according to claim 8, wherein the first projection mechanism comprises a plurality of narrowband light sources energized differently.

10. The display according to claim 8, wherein the first projection mechanism comprises an energizable modulation device illuminated by narrowband light sources.

11. The display according to claim 9, wherein the narrowband light sources comprise LEDs.

12. The display according to claim 8, wherein the first projection mechanism comprises an energizable modulation device illuminated by narrowband light sources and the second modulation device comprises a projector modulator.

13. The display according to claim 8, wherein the display comprises a projection system.

14. The display according to claim 8, wherein the controller determines a PSF for each cluster to project by averaging areas or regions of an image to be displayed, and selecting the PSF that meets a set of predetermined requirements for each area or region, and energizing the first projection device such that the clusters corresponding to each area or region produce the PSF selected for that area of region.

15. The display according to claim 14, wherein the lighting elements are essentially identical but energized at varying energization levels, and wherein lighting elements within a cluster are energized at varying energization levels.

16. The display according to claim 14, wherein the lighting elements are essentially identical but are set to produce varying luminance levels, and wherein lighting elements within a cluster are set at varying luminance levels.

17. The display according to claim 8, wherein luminance levels of the display are set by turning modulating elements on or off.

18. The display according to claim 14, wherein the selected PSFs are produced via on-the-fly customization of a real-time variable PSF property.

19. The display according to claim 18, wherein the customization of a real-time variable property comprises luminance and wherein during one time period a first set of lighting elements of a cluster are off and second set of lighting elements of the cluster are on and during a subsequent time period different sets of lighting elements are either on or off.

20. The display according to claim 18, wherein the PSFs are customized via the application of a custom modulation scheme to each cluster.

21. The display according to claim 20, wherein the custom modulation scheme comprises an energization scheme selected based on image data.

* * * * *